Feb. 28, 1939.  W SCHEPLER  2,148,964
VEHICLE TRAFFIC SIGNAL
Filed March 22, 1938  2 Sheets-Sheet 1
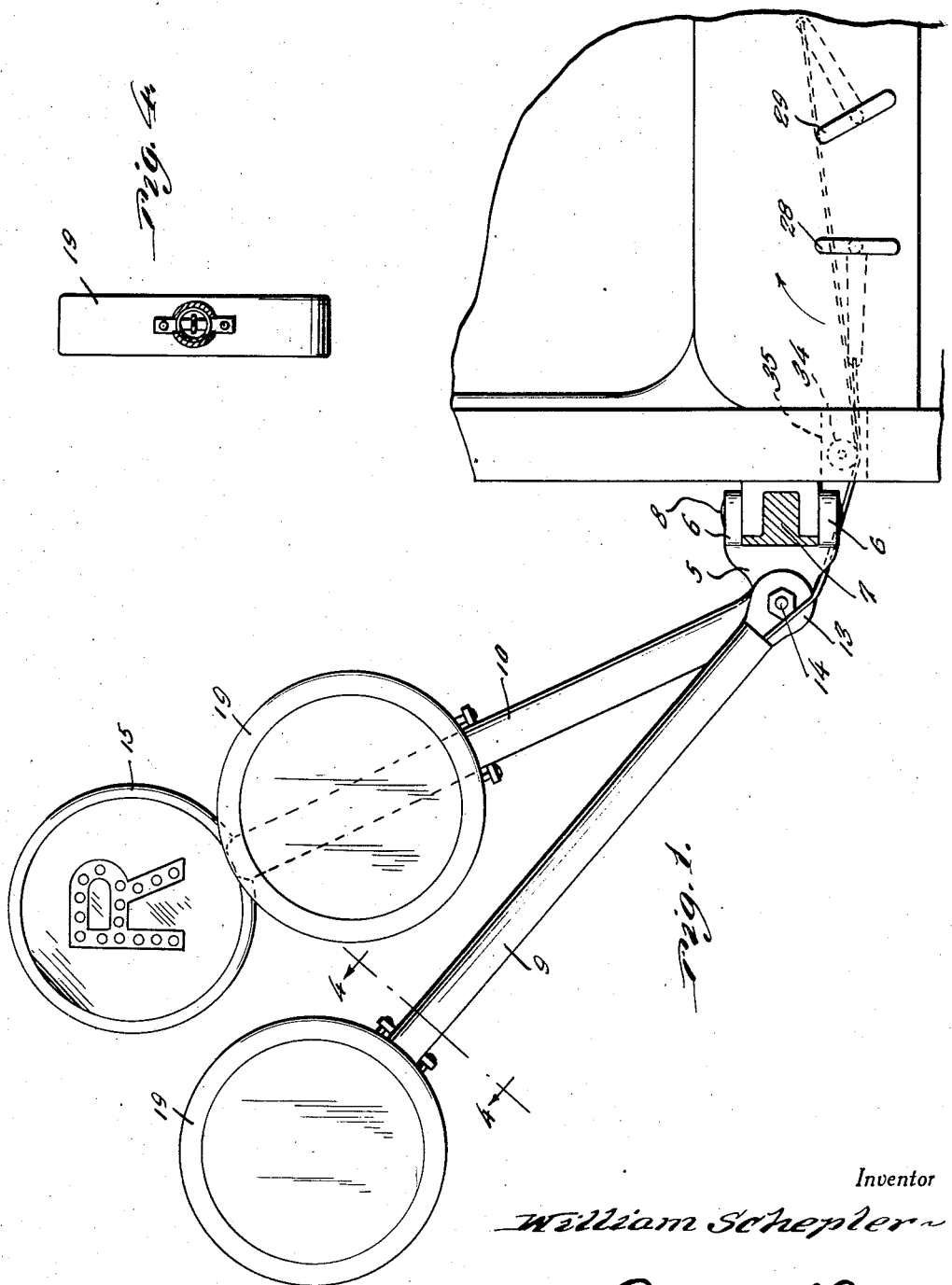
Inventor
William Schepler
By Clarence A. O'Brien
Hyman Berman
Attorneys Feb. 28, 1939. W SCHEPLER 2,148,964
VEHICLE TRAFFIC SIGNAL
Filed March 22, 1938 2 Sheets-Sheet 2
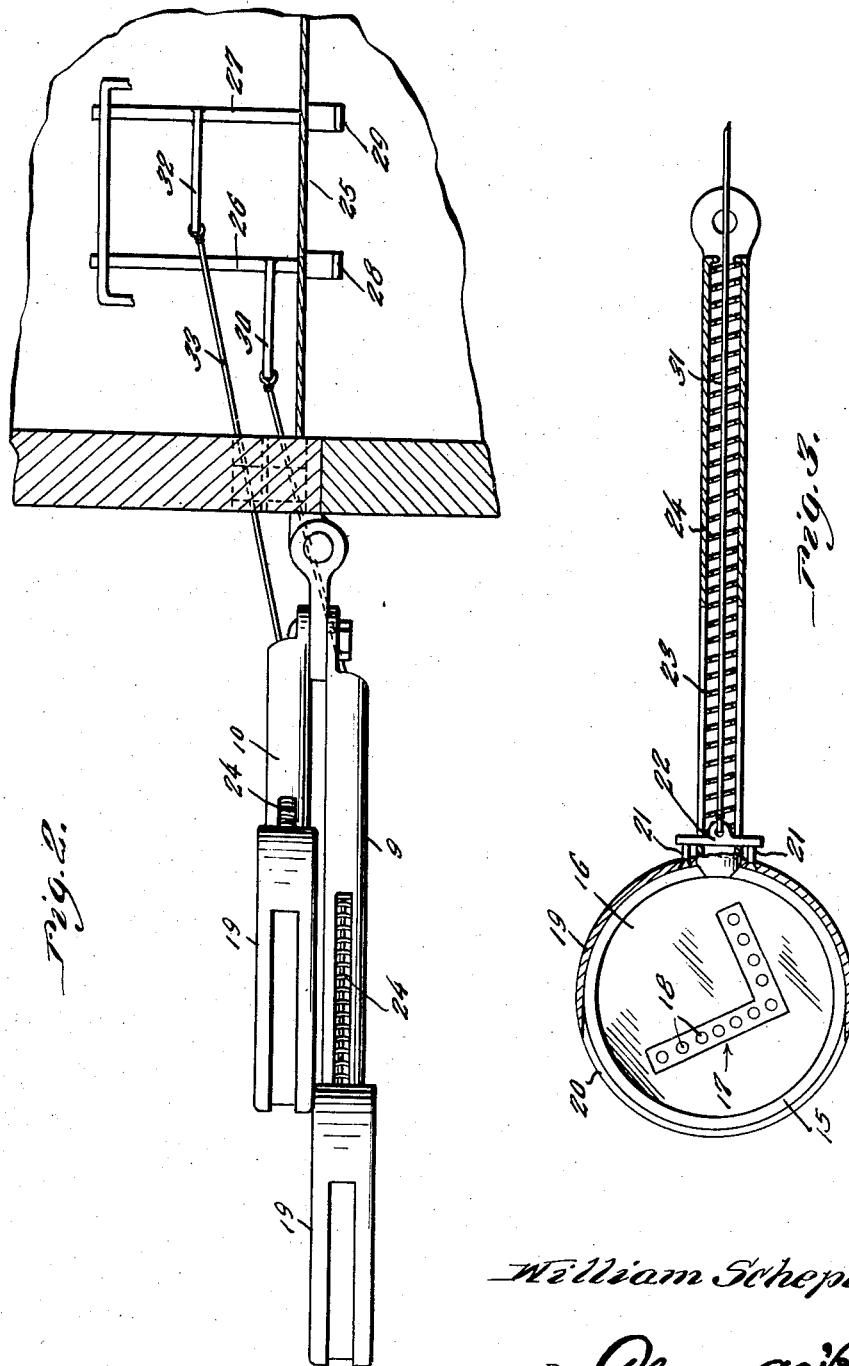
Inventor
William Schepler
By Clarence A. O'Brien
Hyman Berman
Attorneys Patented Feb. 28, 1939

2,148,964

UNITED STATES PATENT OFFICE 2,148,964

VEHICLE TRAFFIC SIGNAL

William Schepler, Spencer, Iowa

Application March 22, 1938, Serial No. 197,454

1 Claim. (Cl. 116—45)

This invention relates to signalling devices and more particularly to signalling devices designed for use on automobiles for indicating the intention of the operator thereof to turn either to the right or left.

The invention together with its objects and advantages will be best understood from a study of the following description taken in connection with the accompanying drawings wherein:—

Figure 1 is an elevational view illustrating the application of the invention,

Figure 2 is a top plan view of the invention and with certain parts of the automobile shown in section to further illustrate the invention, Figure 3 is a longitudinal sectional view through one of the signal arms, and Figure 4 is a sectional view taken substantially on the line 4—4 of Figure 1.

Referring to the drawings by reference numerals it will be seen that in accordance with the present invention I provide an attaching bracket 5 having apertured ears 6 that are adapted to straddle the joint of a hinge 7 for the front door of the automobile at the driver's side of the automobile, whereby said bracket 5 is mounted in position through the medium of the pin 8 of said hinge 7.

Further in accordance with the present invention there is provided a pair of tubular signal arms 9 and 10 and at one end thereof the arms 9 and 10 are flattened as at 13 and disposed at opposite sides of the bracket 5. Arms 9 and 10 are secured at the desired position of angular adjustment through the medium of bolt and nut means 14 that also serve to positively secure the arms 9 and 10 to the bracket 5.

At the outer end thereof each arm 9, 10 is provided with an integral circular frame 15 in which is mounted a transparency 16 that is preferably colored red and is provided with a signal indicium 17.

The signal indicium 17 associated with the arm 9 is in the nature of the letter "L" while the signal indicium 17 associated with the arm 10 is in the nature of the letter "R". Obviously the letter "L" will denote "Left turn" while the letter "R" will denote "Right turn".

Also, and as shown, each of the signal indicia is provided with a plurality of reflector buttons 18.

Also, associated with each arm 9, 10 and normally housing the frame 15 and transparency 16 is a circular housing 19 that is provided in its periphery with an opening 20 permitting the housing to move into a position receiving the frame 15 and associated parts or into a position uncovering the frame 15 and associated parts.

Each housing 19 is slidably associated with its arm and is connected by rivets 21 with a slide 22 that operates within the signal arm. In this connection, and as shown in Figure 3, slide 22 has opposite end portions thereof accommodated in longitudinal slots 23 provided in diametrically opposite sides of the signal arm, and the slide 22 together with its associated casing 19 is normally urged toward the outer or signal-equipped end of the arm through the medium of a coil spring 24 suitably housed within the arm.

For shifting the casings 19 there are suitably journaled within the automobile and behind the instrument board 25 of the automobile shafts 26, 27. The shafts 26, 27 at one end thereof are provided with handles or buttons 28, 29, respectively.

Shaft 26 is also provided with an arm 30 that is connected with the slide 22 associated with arm 9 through the medium of a cable 31; while shaft 27 is provided with an arm 32 that is connected with the slide 22 associated with the arm 10 through the medium of a cable 33.

Cables 31, 33 are trained over rollers 34 provided therefor in an opening 35 provided in the side wall of the automobile.

The manner of using the signal is thought to be obvious. Normally the housings 19 are at the outer extremities of the arms 9 and 10 housing and substantially concealing frames 15 and associated parts.

When, for example, it is desired to indicate that the operator of the automobile is to make a left turn, the operator rotates the shaft 26 in a clockwise direction. The movement of the shaft in this direction will cause a pull on slide 22 associated with arm 9 causing the slide to move inwardly against the action of spring 24. Thus the casing 19 associated with the slide 22 will move to a position uncovering the signal indicia 17 which, in the present instance, is the letter "L" thus indicating clearly the intention of the operator of the vehicle to make a left turn.

Upon release of the button 28 the parts under action of spring 24 will return to their normal positions.

Obviously, in substantially the same manner, is a signal for making a right turn given, shaft 27 being turned in a clockwise direction for giving the signal.

It is thought that a clear understanding of the construction, utility, operation and advantages of a vehicle signal of this character will be had without a more detailed description.

Having thus described the invention what is claimed as new is:

A signal device of the class described comprising a tubular arm, means on one end portion of the arm for mounting said arm on a support, the other end portion of the arm having diametrically opposite, longitudinally extending slots therein, a signal element fixed on said other end of the arm, a slide mounted for longitudinal movement in the arm and slidable in the slots, a casing slidably mounted on the arm and connected to the slide for actuation thereby, said casing being adapted to substantially enclose and conceal the signal element, a coil spring mounted in the arm and engaged with the slide for actuating the casing to operative position, and means extending through the arm and connected to the slide for moving the casing to inoperative position away from the signal element against the tension of the coil spring.

WILLIAM SCHEPLER.